United States Patent [19]

Copeland et al.

[11] Patent Number: 5,432,083
[45] Date of Patent: Jul. 11, 1995

[54] ENZYMATIC METHOD FOR REMOVING OXYGEN FROM OILS AND FATS

[75] Inventors: James C. Copeland, Ashland, Ohio; Howard I. Adler, Oak Ridge, Tenn.

[73] Assignee: Oxyrase, Inc., Ashland, Ohio

[21] Appl. No.: 20,066

[22] Filed: Feb. 19, 1993

Related U.S. Application Data

[63] Continuation-in-part of Ser. No. 451,625, Dec. 18, 1989, abandoned.

[51] Int. Cl.$^6$ .............................. C12S 3/00; C11C 1/00; C12N 1/00; A23L 3/3463
[52] U.S. Cl. .................................... 435/271; 435/262; 435/317.1; 426/417; 426/601
[58] Field of Search .............. 435/262, 264, 281, 820, 435/271, 317.1, 134; 426/524, 601, 602, 654, 417

[56] References Cited

U.S. PATENT DOCUMENTS

| | | | |
|---|---|---|---|
| 3,767,790 | 10/1973 | Guttag | 435/182 |
| 3,850,753 | 11/1974 | Chibata et al. | 435/248 |
| 4,078,971 | 3/1978 | Arkles et al. | 435/317.1 |
| 4,414,334 | 11/1983 | Hitzman | 435/281 |
| 4,476,224 | 10/1984 | Adler | 435/253 |
| 4,501,674 | 2/1985 | Wu | 422/14 |
| 4,996,073 | 2/1991 | Copeland et al. | 435/262 |
| 5,132,219 | 7/1992 | Kilbane | 435/252.31 |
| 5,240,853 | 8/1993 | Copeland et al. | 435/262 |
| 5,362,501 | 11/1994 | Gopeland | 426/12 |

OTHER PUBLICATIONS

104:65496b Chemical Abstracts vol. 104, 1986 Matsushita et al.

*Primary Examiner*—Michael G. Wityshyn
*Assistant Examiner*—Timothy J. Reardon
*Attorney, Agent, or Firm*—Fay, Sharpe, Beall, Fagan, Minnich & McKee

[57] ABSTRACT

The present invention is directed to a novel method and device for removing oxygen from oils. The oils may be in liquid form, such as vegetables oils, etc., in solid form, such as fats, etc. or in some type of intermediate semi-solid form. By removing oxygen from various products containing oils and fats, the present invention is an effective antioxidant for food products, as well as for various industrial and commercial products, such as paints, varnishes, etc. The method comprises the steps of providing an oil containing oxygen and adding to the oil a sufficient amount of an aqueous solution containing oxygen scavenging membrane fragments and a hydrogen donor substance to reduce the oxygen present in the oil to water.

8 Claims, No Drawings

ENZYMATIC METHOD FOR REMOVING OXYGEN FROM OILS AND FATS

This is a continuation-in-part of U.S. application Ser. No. 07/451,625, filed on Dec. 18, 1989, now abandoned.

BACKGROUND OF THE INVENTION

The present invention is directed to a method and device for removing oxygen from oils and fats. The dissolved oxygen is removed from the oils and fats for the purposes of retarding oxidation deterioration, rancidity, gum formation, etc.

The term "oil" is applied to a large variety of substances which differ greatly in chemical nature. However, these substances may be classified by their type and function as follows:
 a. Fixed oils—fatty substances of vegetable and animal organisms—contain esters (usually glycerol esters) or fatty acids.
 b. Volatile or essential oils—odorous principles of vegetable organisms—contain terpenes, camphors, and related compounds.
 c. Mineral oils, fuel oils and lubricants—hydrocarbons derived from petroleum and its products.

Fixed oils are the non-volatile, fatty oils characteristic of vegetables and animals, as opposed to the volatile essential oils of flowers and plants which are readily vaporized by heat. In this regard, fixed oils absorb oxygen and become resinous (drying oils) or remain liquid (non-drying oils) while the essential oils evaporate.

Fixed oils are fatty compounds consisting primarily of triesters or esters of glycerol with fatty acids and are commonly referred to as "triglycerides" or simply "glycerides". A glyceride may be called either a fat or an oil depending upon its melting point and physical consistency at room temperature. In this regard, oils derived from animals, plant seeds or nuts are identical with their respective fats with the exception that the fats are solids and the oils are liquids at room or ambient temperature. However, this distinction is somewhat illusionary in that slight changes in temperature may cause many glycerides to change from liquids to solids or from solids to liquids.

The chemical and physical properties of fixed oils and fats, also known as lipids, vary widely depending to a large extent upon the type of fatty acids in the glyceride. However, in almost all of the commercially important glycerides, the fatty acids are straight chain and contain an even number of carbon atoms. Along this line, the majority of fixed oils and fats are made up of fatty acids of more than 16 carbon atoms.

Fixed oils and fats may be produced from a wide variety of sources including plant, animal, and marine sources. Fixed oils and fats from plant sources, such as vegetable oils, are obtained by pressing or extracting the oils from the seeds, nuts, or fruit pulp of various plants, such as soybean, cottonseed, corn, peanut, sunflower, safflower, olive, rapeseed, sesame, coconut, palm, etc. In seeds, the oil or fat, which is concentrated in the kernel, varies greatly in amount, i.e. soybean (18-22%), peanut (46-50%), and safflower (46-54%). The two main sources for oil from fruit pulp are palms (30-55%) and olive (38-50%). Fixed oils and fats from plant sources have varying degrees of saturation.

Fixed oils from animal sources are produced by rendering (i.e. heating the fatty tissue with steam, hot water, or other solvents to melt the glyceride, followed by separating the oil or glyceride from the water or solvent) the fatty tissue (lard, tallow, etc.) of animals, such as cattle, pigs, poultry, and sheep. In addition, butter fat is an animal fat produced from milk. Fixed oils from marine sources are obtained from fatty tissue (tallow, lard) of whales, herring, etc. by rendering processes similar to those utilized in obtaining fixed oils from animals. Examples of marine oils include fish oils, fish liver oils, sperm oil, etc.

Once the crude fats and oils are extracted from the plant, animal or marine sources, the fats and oils may be utilized in their raw state or they may be further processed and converted to more valuable products. Along this line, the crude fats and oils may be refined to remove various gums, pigments, etc. in the oils, as well as bleached and/or deodorized to produce a uniformed product. Further processing, such as hydrolysis or hydrogenation, may occur to produce many different functional fats such as margarines or shortening.

Fixed oils and fats have a wide variety of commercial uses and exhibit both food and non-food applications. For example, there are both edible and non-edible vegetable oils. Oils such as soybean, sunflower, rapeseed, sesame, and safflower oils, are used predominantly in food processing and food stuffs, while technical and industrial oils, such as castorseed and tung oils, are used in non-food applications. Some oils, such as linseed and olive oil, can be utilized for both food and non-food applications. Examples of some of the primary uses of edible oils are margarine, hydrogenated shortenings, salad and cooking oils, frying oils, food shortening, mayonnaise, salad dressing, filled dairy products, bakery and cake mixes, and non-dairy products. The principle industrial uses of non-edible oils include paints, varnishes, soaps, detergents, plastic additives, and lubricants.

Furthermore, fixed oils and fats may be classified depending upon their "drying" characteristics. The drying of oils refers to the polymerization of the glycerides of unsaturated oils induced by exposure to oxygen In this regard, fixed oils and fats may be classified as drying (linseed, tung), semi-drying (soybean, cottonseed), and non-drying oils (castor, coconut). Drying oils are those which upon exposure to air or oxygen form an elastic film These oils, such as linseed or tung oil, are utilized mainly in paints and varnishes Non-drying oils are those which remain permanently "wet" or "oily" such as olive or castor oil. Semi-drying oils are those which remain "somewhat wet" such as soybean, cottonseed, or corn oil Semi-dry oils are used frequently in cooking and in various food products.

As indicated above, fats and oils may be characterized depending upon their relative volatility. Along this line, "fixed oils" are non-volatile oils which become resinous (drying oils) or remain liquid (non-drying oils) upon exposure to oxygen or heat while "essential oils" are volatile oils which are readily vaporized by heat or the exposure to oxygen or air. Thus, essential or volatile oils are classified separately from fixed or non-volatile oils.

More particularly, essential oils are any of the odoriferous oily products which are distillable from plants. Essential oils are distinguished from "fixed" or fatty oils by their volatility, non-greasiness, and non-saponifying properties Essential oils exist in plants, specifically in the oil sacs found in the leaves (patchouli), twigs (clove stems), blossoms (rose), fruit (mandarin), bark (cinnamon), roots (ginger), buds (cloves), berries (pimenta), seed (caraway), gum (myrrh), balsam (tolu balsam), etc. of a wide variety of plants. As such, essential oils produce the characteristic odor of the flowers, leaves, roots, etc. of plants. These plants are processed by comminution, and the action of heat, water, and solvents to yield their essential oils. The essential oils may then be utilized as flavor and/or fragrance agents in various food products and beverages, cosmetics, perfumes, etc.

Examples of the commercially available essential oils include allspice (pimenta berry), bitter almond, amyris, anise, star anise, sweet basil, bay (myrcia), bergamot, sweet birch, bois de rose (rosewood), camphor, cananga, caraway, cardamom, cassia, cedarwood, cinnamon, citronella, clove, coriander, eucalyptus, geranium, ginger, grapefruit, jasmine, juniper, labdanum, lavandin, lavender, lemon, distilled lime, japanese mint, neroil, nutmeg, ocotea, bitter orange, sweet orange, origanum, orris root, palmarosa, patchouli, black pepper, peppermint, petitgrain, bigarade, pine, pinus pumilio, rose, rosemary, dalmation sage, sage clary (sage muscatel), East Indian sandalwood (santal), spearmint, spike lavender (spike), thuja (cedarleaf), thyme, turpentine, vetiver, wintergreen, and ylang ylang.

While fixed and/or essential oils and fats may be processed through various refinement steps such as filtration, deodorization, bleaching, etc., several forms of deterioration, such as oxidation and hydrolytic rancidity, can occur over time. As a result, various unwanted flavors and odors may develop. For example, soybean oil can develop a disagreeable fishy flavor or beef fat can become tallow. Hence, oxidative and hydrolytic rancidity in fixed and/or essential oils and fats is a serious flavor and odor defect and is highly objectionable.

In this regard, it is well known that the presence of oxygen in products containing oils and fats can cause a great deal of detrimental damage. For example, the off-flavors developed in lard, vegetable oils, hydrogenated shortenings, crackers, biscuits, breakfast cereals, dry cake mixes, and essentially all foods that incorporate lipids are produced by oxidation. Similarly, oxidation is usually associated with the spoilage of dried whole milk, cream, butter, and butter oil. In addition, many essential oils became darker and thicker upon exposure to air.

The changes which occur in fixed and/or essential oils and fats over time including changes in color, consistency, and odor. This is reportedly due to the formation of hydroperoxides which then decompose to form aldehydes which have a disagreeable odor and flavor. Since these changes in fixed and/or essential oils and fats greatly decrease the product's marketability, it is desirable to reduce the presence of oxygen in the overall product.

In addition, it is also desirous to remove oxygen from various commercial or industrial fixed oils and fats. This is particularly true in non-edible vegetable oils used in paints and varnishes, wherein the presence of oxygen can create undesirable by-products, such as gum formation, etc.

Various packaging products, devices, processes, and chemical agents (i.e. antioxidants) have been developed over the years to retard the damage produced by oxidation of fixed and/or essential oils and fats. For example, oxidation retardation may be brought about by using opaque air-tight containers, or the nitrogen blanketing of clear glass bottles may be used. In addition, various deoxygenating devices including vacuum systems, oxygen-purging apparatuses, etc. are used to extract the oxygen. However, vacuum dereators and gas flushing apparatuses are fairly expensive and they do not necessarily reduce the dissolved oxygen content to an acceptable level. Moreover, these apparatuses have some drawbacks in that lubricants used therein sometimes find their way into the oils and fats being treated. The inclusion of even a small amount of such harmful agents within oils and fats utilized in beverage and/or food products can produce undesirable color and/or flavor changes in the overall product, as well as toxic effects.

Furthermore, various chemical agents, i.e. antioxidants, can be added to the fixed and/or essential oils and fats to retard oxidation and associated deterioration. Along this line, chemical antioxidants are required in animal fats since the animal fats contain no natural antioxidant materials. Although vegetable oils contain some nature antioxidants such as tocopherols (vitamin E active), tocopherols are not synthesized by mammals and occur in their fats only through the ingestion of plant materials and vegetable oils.

In addition, while vegetable oils contain some natural antioxidants, these antioxidants are often insufficient for even a relatively short period of time. Additional chemical antioxidants can be added to the fats and oils, however, with the exception of tertiary butyl hydroquinone (TBHQ), these chemical antioxidants are not very effective in oils and fats. Moreover, the consuming public is becoming increasingly more concerned about the uses of chemicals and preservatives in foods including antioxidants. Thus, a great deal of research is currently being undertaken in order to develop not only more universal, but also safer, antioxidants.

Chemical antioxidants are compounds added to various materials for the purposes of retarding oxidation and associated deterioration. They may be utilized alone or in combination with deoxygenating processes such as those indicated above. Chemical antioxidants operate by binding with specific intermediate free radicals (i.e. peroxy radicals) produced during oxidation degradation. By binding with the intermediate free radicals, the free radicals are incapable of propagating the chain reaction to decompose into other harmful free radicals. As a result, by binding with the intermediate reactant, antioxidants effectively inhibit the oxidation degradation reaction. A more detailed explanation concerning the operating mechanism of antioxidants may be found in *Van Nostrand Reinhold Encyclopedia of Chemistry*, Fourth Edition, 1984.

However, the use of antioxidants in foods, pharmaceuticals, and animal feeds, as direct additives is closely regulated. Along this line, when used in foods, chemical antioxidants are regulated to extremely low percentages by the Food and Drug Administration (FDA). Although antioxidants have been utilized for several decades and occur naturally in some food substances, intensive research continues in order to develop universal non-toxic antioxidants.

In this regard, the desirable properties of antioxidants, particularly when used in food products, may be summarized as indicated by *Van Nostrand Reinhold*, supra, by the following characteristics: (1) effectiveness at low concentrations; (2) compatibility with the substrate; (3) non-toxicity to consumers; (4) stability in terms of conditions encountered in processing and storage, including temperature, radiation, pH, etc.; (5) non-volatility and non-extractability under the conditions of use; (6) ease and safety in handling; (7) freedom from off-flavors, off-odors, and off-colors that might be imparted to the food products; and (8) cost effectiveness. As a result, antioxidants vary greatly depending upon such factors as the composition of the substrates, pH, temperature, processing conditions, impurities etc.

Accordingly, the present invention is directed to a method and device for continuously removing oxygen from fixed and/or essential oils and fats in a safe and efficient manner. The method and composition of the present invention may be utilized as an antioxidant in industrial oils and fats such as paints and varnishes, as well as food products, without altering the desired properties of the products produced thereby. The method and device of the invention fulfill the desired properties of an effective antioxidant as indicated above.

SUMMARY OF THE INVENTION

In one aspect, the present invention is directed to a method for removing oxygen from oils and fats and/or from substances containing oils and fats. The method comprises the steps of providing an oil and/or fat containing oxygen and adding to the oil and/or fat a sufficient amount of an aqueous solution containing oxygen scavenging membrane fragments to reduce the oxygen present in the oil and/or fat to water.

In another aspect, the present invention relates to a device for removing oxygen from oils and fats or substances containing oils and fats. The device comprises a means for holding or containing an oil and/or fat substance having a substance contact surface and a non-substance contact surface, wherein said substance contact surface contains a sufficient amount of oxygen scavenging membrane fragments to reduce the oxygen present in the oils and fats to water.

In a further aspect, the present invention is directed to a method for removing oxygen from fixed oils. The method comprises the steps of providing a fixed oil containing oxygen and adding to the fixed oil a sufficient amount of an aqueous solution containing oxygen scavenging membrane fragments to reduce the oxygen present in the oil to water.

In an additional aspect, the present invention relates to a device for removing oxygen from fixed oils or substances containing fixed oils. The device comprises a means for holding or containing a fixed oil substance having a substance contact surface and a non-substance contact surface, wherein said substance contact surface contains a sufficient amount of oxygen scavenging membrane fragments to reduce the oxygen present in the fixed oil to water.

In a still further aspect, the present invention is directed to a method for removing oxygen from essential oils. The method comprises the steps of providing an essential oil containing oxygen and adding to the essential oil a sufficient amount of an aqueous solution containing oxygen scavenging membrane fragments to reduce the oxygen present in the oil to water.

In still another aspect, the present invention relates to a device for removing oxygen from essential oils or substances containing essential oils. The device comprises a means for holding or containing an essential oil having a substance contact surface and a non-substance contact surface, wherein said substance contact surface contains a sufficient amount of oxygen scavenging membrane fragments to reduce the oxygen present in the essential oil to water.

DETAILED DESCRIPTION OF THE INVENTION

The present invention is directed to a novel method and device for removing oxygen from oils, such as fixed and essential oils. The oils may be in liquid form, such as vegetables oils, etc., in solid form, such as fats, etc. or in some type of intermediate semi-solid form. By removing oxygen from various products containing oils and fats, the present invention is an effective antioxidant for food products, as well as for various industrial and commercial products, such as paints, varnishes, etc.

More particularly, the present invention relates to a method and device for removing oxygen from oils and fats through the use of oxygen scavenging membrane fragments from various bacterial sources, such as the organism *Escherichia coli*, and/or mitochondrial membrane fragments from the mitochondrial organslies of a large number of higher non-bacterial organisms. Although it was known that the membrane fragments from the bacterial sources, such as the organism *Escherichia coli*, possessed some sort of integrated electron transport system consisting of a complex series of enzymes which worked in cooperation with one another, as well as with other factors, to reduce oxygen to water, the system was thought to function only in aqueous environments. This was because not only are the fragments utilized in the present invention obtained from cell and/or mitochondrial membrane fragments of various living organisms and the chemistry of living things is generally thought to be aqueous based, the electron transport system and other factors present in the membrane fragments were thought to be very complex and highly sensitive to environmental conditions. As a result, the oxygen scavenging membrane fragments were believed to function only in the aqueous environments such as that present in the inside or outside of cells.

In this regard, all of the previous experiments conducted by the present inventors concerning the oxygen scavenging membrane fragments were performed in aqueous environments. In addition, no literature was found related to the use of such fragments in non-aqueous solutions.

However, as more particularly demonstrated below, the experimental results collected by the present inventors clearly indicate that the membrane fragments are very effective in removing oxygen in the oils and fats. More particularly, the results indicate that not only are the oxygen scavenging fragments able to diffuse from an aqueous solution directly into the oil, the membrane fragments are still able to function and remove oxygen from the oil.

More particularly, the present inventors have discovered that if the membrane fragments are added to oil with an aqueous solution containing a hydrogen donating substrate, the membrane fragments effectively diffuse from the aqueous solution into the oil. The membrane fragments then utilize the hydrogen donor substrate present in the aqueous solution to reduce the oxygen present in the oil to water.

The results obtained through the use of the membrane fragments in oil were greatly unexpected not only for the reasons set forth above, but also because the diffusion of the membrane fragments from the aqueous environment into the oil was not anticipated. In this regard, the present inventors had expected the membrane fragments to remain in the aqueous phase. The inventors had hoped that the oxygen dissolved in the oil would have then diffused from the oil into the aqueous phase because of the low to non-existent oxygen concentration in the aqueous phase due to the presence of the oxygen reducing membrane fragments. This oxygen concentration gradient would have favored the removal of the dissolved oxygen from the oil into the aqueous phase where it would have reacted with the membrane fragments and the hydrogen donating substrate to produce water.

In addition, the present inventors were also of the view that even if the membrane fragments could have somehow unexpectedly diffused into the oil, the complex and sensitive electron transport system present in the membrane fragments would have been inactivated due to the dissolution of the membrane fragments in the oil media. Although this may be true over time (see Example 3 below), the present inventors have discovered that at least over a somewhat effective period, i.e. 24 hours, the enzyme system present in the membrane fragments are sufficiently active to remove oxygen from oil. This time frame may be enhanced in the near future through the development of various cross-linking agents which can be used in order to stabilize the structure of the membrane fragments, thereby improving the enzyme systems integrity and/or activity.

The oxygen scavenging bacterial cell membrane fragments utilized in the present invention, as well as the process for isolating and purifying same, are similar to the membrane fragments and filtration process disclosed in U.S. Pat. No. 4,476,224 for "Material and Method for Promoting the Growth of Anaerobic Bacteria", issued on Oct. 9, 1984 to Howard I. Adler, Oak Ridge, Tenn., one of the co-inventors of the present invention. The '224 patent is incorporated herein by reference.

The '224 patent is directed to a method of removing dissolved oxygen from a nutrient medium for anaerobic bacteria through the use of sterile membrane fragments derived from bacteria having membranes which contain an electron transport system which reduces oxygen to water in the presence of a hydrogen donor in the nutrient medium. It is known that a great number of bacteria have cytoplasmic membranes which contain the electron transport system that effectively reduces oxygen to water if a suitable hydrogen donor is present in the medium. Some of the bacterial sources identified in the '244 patent include *Escherichia coli, Salmonella typhimurium, Gluconobacter oxydans,* and *Pseudomonas aeruginosa.* These bacterial membranes have been highly effective in removing oxygen from media and other aqueous and semi-solid environments.

The same oxygen reducing effects produced by the cell membrane fragments from the bacterial sources indicated above, are also present in the membrane of mitochondrial organelles of a large number of higher non-bacterial organisms. More particularly, a great number of fungi, yeasts, and plants and animals have mitochondria that reduces oxygen to water, if a suitable hydrogen donor is present in the medium. Some of the sources of oxygen reducing membranes from these mitochondria are: beef heart muscle, potato tuber, spinach, Saccharomyces, Neurospora, Aspergillus, Euglena and Chlamydomonas. The process of producing the useful mitochondrial membrane fragments involves the following steps:

1. Yeast, fungal cells, algae and protozoa, having mitochondrial membranes containing an electron transfer system which reduces oxygen to water, are grown under suitable conditions of active aeration and a temperature which is conducive to the growth of the cells, usually about 20° C. to 45° C. in a broth media. Alternately, mitochondria may be obtained from cells of animal or plant origin.
2. The cells are collected by centrifugation or filtration, and are washed with distilled water.
3. For the preparation of crude mitochondrial membrane fragments, a concentrated suspension of the cells is treated to break up the cell walls and mitochondria. This is accomplished by known means, for example, by ultrasonic treatment or by passing the suspension several times through a French pressure cell at 20,000 psi.
4. The cellular debris is removed by low speed centrifugation or by microfiltration (cross-flow filtration).
5. The supernatant or filtrate is subjected to high speed centrifugation (175,000×g at 5° C.) or ultrafiltration.
6. For the preparation of material of higher purity, the cells of step 2 are suspended in a buffer containing 1.0M sucrose and are treated by means which break up the cell walls or membranes but leave the mitochondria intact. This is accomplished by known means, for example, by ultrasonic treatment, passage through a French pressure cell at low pressure, enzymatic digestion or high speed blending with glass beads.
7. The cellular debris from step 6 is removed by differential centrifugation or filtration.
8. The supernatant or retentate from step 7 is passed through a French Press at 20,000 psi to break the mitochondria into small pieces.
9. Mitochondria debris from step 7 is removed by centrifugation at 12,000×g for approximately 15 minutes or by microfiltration.
10. The supernatant or filtrate from step 9 is subjected to high speed centrifugation (175,000×g at 5° C.) or ultrafiltration.
11. The pellet or retentate from step 5 (crude mitochondrial fragments) or the pellet or retentate from step 10 (purified mitochondrial membrane fragments) are resuspended in a buffer solution at a pH of about 7.0 to about 7.5. A preferred buffer solution is 0.02M solution of N-2-hydroxyethylpiperazine-N-2-ethane sulfonic acid (HEPES).
12. The membrane fragments in the buffer solution are then passed under pressure through a filter having openings of about 0.2 microns.
13. The suspension is then stored at about −20° C. for later use or it may be freeze dried.

This process, as well as the media produced thereby, is the subject matter of a separately filed U.S. patent application, i.e. Ser. No. 938,190, now abandoned, filed on Dec. 5, 1986 for "Material and Method for Promoting Growth of Anaerobic Bacteria". The cell and/or mitochondrial membrane fragments utilized in the present invention are produced according to the processes set forth in the '224 patent and the above identified co-pending application.

Furthermore, since many products containing oils and fats do not contain organic substrates, it may be necessary to add a hydrogen donor in order for the enzyme system present in the cell and/or mitochondrial membrane fragments to reduce the oxygen present in the oils and fats to water. Suitable hydrogen donors are lactic acid, succinic acid, alpha-glycerol phosphate, formic acid, malic acid, and where available, their corresponding salts.

Moreover, the temperature and pH of the oils and fats may have to be adjusted in order to optimize the deoxygenation process. Along this line, it has been determined that the enzymes present in the membrane fragments operate over wide pH and temperature ranges dependent upon the type of membrane fragments utilized (i.e. cell membrane fragments from the organism *Escherichia coli* have a pH range of about 6 to about 9, while cell membrane fragments from the organism *Acetobacter aceti* have a pH range of about 3 to about 8) and substrate present (i.e. from an overall pH of about 3 to a pH of about 9, and from a temperature of about 5° C. to about 60° C.). With lactic acid as a substrate, the pH optimum is about 8.4 for cell membrane fragments from *Escherichia coli*. However, with formic acid as a substrate the pH optimum for cell membrane fragments for *Escherichia coli* is below 7.0. By choosing the substrates and membrane fragments, it is possible to select the operating pH level and temperature that would be suitable for a particular application.

In addition, while the oxygen scavenging membrane fragment may be added directly to the product containing oils and fats for the purposes of deoxygenating the substance, the fragments may also be indirectly added to the products by incorporating the membrane fragments into the substance contact surface of the means utilized for containing the product. In this regard, the membrane fragments can be incorporated into a large variety of substance contact surfaces such as the polymeric liners of bottles and cans, the plastic container itself, product wrappers, etc. By incorporating the membrane fragments into the substance contact surfaces, the storage conditions of the packaged product may be improved without directly effecting the product.

The process and device of the present invention relating to the removal of oxygen from oils and fats can be used, either directly or indirectly, for removing oxygen in various products containing fixed oils and fats, as well as essential oils. Examples of such fixed oils and fats are food products, including margarine, shortening, salad oils, cooking oils, frying oils, mayonnaise, salad dressings, non-dairy products, bakery, and cake mixes, and industrial and/or commercial products, such as paints, varnishes, soaps, detergents, and lubricants. Examples of essential oils which can be utilized in the present invention include the flavor and fragrance agents indicated above.

The following examples are set forth for the purpose of further illustrating the preferred embodiments of the present invention.

EXAMPLE 1

In order to determine the effectiveness of the electron transport system present in the membrane fragments in oils, the membrane fragments obtained from the organism *Escherichia coli* (i.e. "OXYRASSE ®") were utilized as the test specimen. Along this line, the following amounts of OXYRASE ® and 1M sodium lactate and buffer solution were added to oil samples in an aqueous phase:

|  | Tube #1 | Tube #2 | Tube #3 |
| --- | --- | --- | --- |
| Oil | 10 ml | 10 ml | 10 ml |
| 1M Na Lactate | 0.20 ml | 0.35 ml | — |

| -continued | | | |
| --- | --- | --- | --- |
|  | Tube #1 | Tube #2 | Tube #3 |
| OXYRASE ® | 0.20 ml | 0.05 ml | — |
| 0.02 Pot. Phos. Buff. pH 8.4 | — | — | 0.40 ml |

The oil used was Hollywood 100% Pure Safflower Oil (Hollywood Foods, Los Angeles, Calif.). The tubes used were Corning 15 ml centrifuge tubes (Corning Glass Works, Corning, N.Y.). The membrane fragments (i.e. OXYRASE ®) were either isolated and purified by the process set forth above (i.e. the process set forth in the '224 patent and/or the '190 application, now abandoned) or the membrane fragments were commercially purchased from Oxyrase, Inc., Ashland, Ohio.

In this regard, one unit of the suspension of the cell membrane fragments of the organism *Escherichia coli* present in the commercially purchased OXYRASE ® solution is the amount of membrane fragments that reduces 1.0% of dissolved oxygen per second per milliliter of a solution containing 1.75 ml of a 10 mM sodium lactate solution in 20 mM phosphate buffer at a pH of 8.4 and a temperature of 37° C.

The tubes were vortexed at a maximum speed with a Labline Super Mixer (Lab Line Instruments, Inc., Melrose Park, Ill.) for one minute to form an emulsion. After allowing the tubes to sit for one hour at room temperature, no noticeable separation of the oil and aqueous layers was observed. The samples were then centrifuged with an IEC HN-S Centrifuge (Damon/IEC Division, Needham Hts., Mass.) for one hour at 1500 rpm thereby producing a bottom aqueous layer and a top oil layer. The tubes were subsequently pierced with a hot 21 gauge needle and the bottom aqueous layers of the three tubes were collected for analysis.

The aqueous layers collected from the three tubes were tested for the enzyme activity of the electron transport system of the cell membrane fragments from the organism *Escherichia coli* ("OXYRASE ®") using standard conditions. More particularly, the tests were run by introducing 20 ul of each aqueous layer into 1.75 ml of a 10 mM sodium lactate solution in pH 8.4 0.02M potassium phosphate buffer at 37° C. into the reaction chamber of a Gilson Oxygraph 5/6 (Gilson Medical Electronics, Middleton, Wis.). The rate of oxygen reduction was recorded as a function of time. The results are reported below in Table 1.

TABLE 1

|  | Activity |
| --- | --- |
| Tube 1 | 0 |
| Tube 2 | 0 |
| Tube 3 | 0 |

The results indicated that no enzymatic activity was present in any of the aqueous layers. In addition, the aqueous layers were very clear (as opposed to the amber, slightly turbid liquid characteristic of the OXYRASE ® suspension) indicating that the cell membrane fragment containing the electron transport system had left the aqueous layer and were transferred to the oil layer after only a relatively short period of time. As indicated above, this was greatly unexpected.

EXAMPLE 2

Although the above experiment indicated that the membrane fragments had been transferred from the aqueous layer to the oil layer in a relatively short period of time and remained in the oil layer upon centrifugation, it failed to indicate whether the electron system present in the membrane fragments was active. In order to determine whether the electron transport system of the membrane fragments of the organism *Escherichia coli* ("OXYRASE ®") present in the oil was active in reducing dissolved oxygen, the following amounts of OXYRASE ®, 1M sodium lactate (substrate) and water were added to two oil samples in an aqueous phase:

|  | Tube #1 | Tube #2 |
|---|---|---|
| 1M Na Lactate | 0.2 ml | 0.2 ml |
| OXYRASE ® (diluted 1:3) | 0.2 ml | — |
| Water | — | 0.2 ml |

The above two tubes were vortexed for one minute to create an emulsion. The tubes were then incubated for 48 hours at 35° C., after which the tubes were centrifuged in an IEC HN-S Centrifuge (Damon/IEC Division, Needham, Mass.) at 1000 rpm for 30 minutes to form a bottom aqueous layer and a top oil layer. The tubes were then pierced with a hot 21 gauge needle and the bottom aqueous layers from the two tubes were collected for assay.

The aqueous layers were assayed by adding measured amounts of the aqueous fluid to 0.02M pH 8.4 buffer in the chamber of an oxygen sensor, i.e. Oxygraph, Gilson Model 5/H H, manufactured by Gilson Medical Electronics, Middletown, Wis., having an oxygen sensitivity of 0.1 ppm. After equilibrium, 20 ml of standard OXYRASE ® (Oxyrase, Inc., Ashland, Ohio) was added to the chamber and the amount of oxygen removed was determined. Tube 1 showed no activity of the electron transport system present in the freshly added OXYRASE ® above background, indicating that none of the sodium lactate was present (i.e. it was being utilized with the original OXYRASE ® in the oil). This result demonstrated that the electron transport system of the membrane fragments of the organism *Escherichia coli* (i.e. OXYRASE ®) was not inactive in oil, but remained active and was capable of reacting with the lactate substrate in the aqueous phase.

In contrast, Tube 2 showed the expected amount of oxygen removed. This indicates that all of the sodium lactate originally added was recovered in the aqueous phase from the oil-water emulsion. The difference between Tube 1 and Tube 2 is the presence of OXYRASE ®. Since it is known that OXYRASE ® will convert sodium lactate to sodium pyruvate in the presence of dissolved oxygen, the above results are consistent with the discovery that the electron transport system of the membrane fragments of *Escherichia coli* (i.e. OXYRASE ®) actively reduced oxygen in oil. These results suggest the interpretation that not only are the membrane fragments containing the electron transport system (i.e. OXYRASE ®) soluble in oil, the enzyme system remains active in the oil thereby removing the oxygen present therein.

EXAMPLE 3

In order to determine the length of time that the electron transport system from the organism *Escherichia coli* (i.e. OXYRASE ®) remained active while dissolved in oil, 0.5 ml of OXYRASE ® was added to six centrifugal tubes containing 5 ml of Safflower Oil (Hollywood Foods, Los Angeles, Calif.). A control tube was also utilized containing the dissolved oil but no OXYRASE ®. The tubes were vortexed at full speed for one minute. To the first tube 0.4 ml, 0.1M sodium lactate (substrate) was added and the tube was vortexed at full speed for one minute. All of the tubes were incubated at 35° C.

After 24 hours, the first tube was centrifuged in an IEC HN-S Centrifuge (Damon/IEC Division, Needham, Mass.) for 30 minutes and the aqueous layer was harvested. The amount of remaining sodium lactate was determined according to the procedure set forth in Example 2 above.

In addition, 0.4 ml of 0.1M sodium lactate was added to the second tube which was then vortexed for one minute. The second tube, along with the remaining four tubes, were incubated for an additional 24 hours. After the additional 24 hours, the amount of sodium lactate remaining was determined.

The above process was repeated in 24 hour intervals for tubes 3-6. The results are set forth below in Table 2.

TABLE 2

| Tube Number | % Lactate Recovered | % Lactate Utilized |
|---|---|---|
| Control | 97.5 | 2.5 |
| Tube 1, Lactate + OXYRASE ® 0-24 hours | 45 | 55 |
| Tube 2, Lactate + OXYRASE ® 24-48 hours | 85 | 15 |
| Tube 3, Lactate + OXYRASE ® 48-72 hours | 82 | 18 |
| Tube 4, Lactate + OXYRASE ® 72-96 hours | 96 | 4 |
| Tube 5, Lactate + OXYRASE ® 96-120 hours | 88 | 12 |
| Tube 6, Lactate + OXYRASE ® 120-144 hours | 98 | 2 |

The results demonstrated the length of time the electron transport system present in the membrane fragments remained active while dissolved in Safflower oil. The control sample showed that greater than 95% of the lactate substrate was recoverable in the aqueous phase from the oil-water emulsion. The results indicated that the cell membrane fragments from the organism *Escherichia coli* dissolved in oil and incubated at 35° C. reacted with about 55% of the available substrate in the first 24 hours. During the second and third 24 hour period, the OXYRASE ® reacted with between 15% and 20% of the available lactate substrate. This showed that there was a decrease in the activity of electron transport systems present in the cell membrane fragments with the amount of time spent in the oil. During the fourth and fifth 24 hour period the amount of activity decreased further to between 5% and 10%. Finally, at the sixth 24 hour period the amount of substrate reacted was less than 5%.

Furthermore, the results also demonstrated that the electron transport system present in the membrane fragments lost activity with time in oil. One explanation for this observation is that the integrity of the enzyme system is being destroyed as the membranes dissolve into the oil. As the membrane fragments come apart, activity of the enzyme system is probably being destroyed. If membrane dissolution accounts for the loss of activity, this problem may be overcome by crosslinking the membrane fragments.

EXAMPLE 4

The following experiment was conducted for the purpose of determining the effectiveness of oxygen scavenging cell membrane fragments isolated from the organism *E. coli* ("OXYRASE ®").

Procedure:

Three 20 ml. samples of each vegetable oil set forth below in Table 3 were prepared as follows: Each sample was oxygenated by high speed vortexing for sixty seconds. One and one-half ml of 1 molar lactate was then added to each sample to serve as a substrate for the OXYRASE ®. 1.0 ml of phosphate buffer (0.02M, ph 8.4) was added to one sample, which served as an oxygenated control with air in the headspace. The second sample also had 1.0 ml of phosphate buffer added, and was overlaid with $N_2$ in the headspace. This sample served as an oxygenated oil control with nitrogen in the headspace. The $N_2$ overlay was used to prevent additional oxygen from getting into the oil during incubation. 1.0 ml of OXYRASE ® was added to the third sample and it was also overlaid with $N_2$. The samples were then mixed on a magnetic stir plate for one hour at room temperature, followed by a thirty minute centrifugation at 1500 rpm to separate out the aqueous lactate. The oxygen level of each oil sample was measured with a Gilson 5/6 Oxygraph.

The essential oils set forth in Table 3 were prepared in 3 ml samples. Due to the small amount of available sample, and because there was no detectable difference in the air and nitrogen overlaid controls above in the vegetable oils, only nitrogen overlays were run on the essential oils. Proportions of 1M lactate, phosphate buffer, and OXYRASE ® were added as indicated above. Samples were mixed on a rotary shaker at room temperature for an hour. The oxygen level of each sample was then tested on a Gilson 5/6 Oxygraph.

Results:

All of the vegetable oils and several of the essential oils tested showed a significant reduction of oxygen after one hour of incubation at room temperature. The percent of oxygen reduced for each of the tested oils is as follows:

TABLE 3

| Oil | % $O_2$, Reduced |
| --- | --- |
| Olive | 26 |
| Safflower | 42 |
| Sunflower | 43 |
| Corn | 55 |
| Soybean | 72 |
| Walnut | 85 |
| Peanut | 32 |
| Canola | 50 |
| Heavy Mineral | 20 |
| "Crisco" (mixture of canola, sunflower and | 60 |
| Wintergreen | 27 |

TABLE 3-continued

| Oil | % $O_2$, Reduced |
| --- | --- |
| Cinnamon | 22 |
| Clove | <10 |
| Orange | <10 |

Olive - Oil Hunt-Wesson, Inc., P.O. Box 4800, Fullerton, California 92643
Safflower - Hollywood Foods, Los Angeles, California 90061
Corn - Best Foods, CPC International, Inc., Engelwood Cliffs, NJ 07632
Soybean - Red Food Stores, Inc., P.O. Box 22008, Chattanooga TN 37422
Walnut - Loriva Supreme Foods, 4010 Oser Avenue, Hauppauge, New York 11788
Peanut - Hollywood
Canola - Red Foods, Inc.
Mixture - Procter and Gamble, Cincinnati, Ohio 45202
All Essential Oils distributed by Lorann Oils, Inc., 4518 Aurelius Road, Lansing, Michigan 48910.
Conclusion: This study showed that by direct measurement, OXYRASE ® reduced a significant percentage of oxygen in the oils tested.

EXAMPLE 5

That in order to determine the effectiveness of different organic acid substrates with oxygen scavenging cell membrane fragments isolated from alternative organisms (i.e. *E. coli* and Azotobacter), the following experiment was conducted:

20 ml of the different oils indicated below in Table 4 were vigorously aerated for 1 minute and placed into a 25 ml Ehrlenmeyer flask. 1.5 ml of substrate was then added, and finally 1 ml OXYRASE ®. The air was replaced with nitrogen gas (in the headspace of the flask), the flask covered with a tight aluminum foil seal, and the contents mixed for 1 hour at room temperature. The contents were then centrifuged for 20 minutes at 1500 rpm to separate the phases, and the oil was placed in a Gilson 5/6 Oxygraph for analysis of oxygen content. A blank flask using 0.02M phosphate buffer, ph 8.4, in place of substrate and OXYRASE ® was also prepared, and the results were expressed as the percent of the oxygen removed from the baseline amount provided by the blank.

TABLE 4

| For *E. coli* OXYRASE ® % Oxygen Removed | | Substrate | | |
| --- | --- | --- | --- | --- |
| Oil | Lactate | Formate | Succcinate | AGP |
| Soybean | 47% | 62% | 36% | 18% |
| Corn | 30% | 88% | 75% | — |
| Mineral | 19% | 29% | 15% | 16% |

| For Azotobacter OXYRASE ® % Oxygen Removed | | Substrate | |
| --- | --- | --- | --- |
| Oil | Lactate | Formate | AGP |
| Soybean | 14% | 20% | 41% |

The test results shown above indicate that oxygen scavenging cell membrane fragments isolated from various sources are effective when utilized with several different hydrogen donor substances and/or organic acid substrates in removing oxygen from a number of different types of oils and fats.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A method for removing oxygen from oils comprising the steps of:
   a) providing an oil containing oxygen; and,
   b) adding to the oil sufficient amounts of an aqueous solution containing isolated oxygen scavenging cytoplasmic membrane fragments of bacteria and a hydrogen donating organic substrate selected from the group. Consisting of lactic acid, succinic acid. alpha-glycerol phosphate, formic acid and malic acid to reduce the oxygen present in the oil to water using the hydrogen supplied by the hydrogen donating substrate under conditions suitable for reducing the oxygen present in the oil to water.

2. The method of claim 1, further comprising the step of agitating the oil-aqueous solution mixture.

3. A method for removing oxygen from fixed oils comprising the steps of:
   a) providing a fixed oil containing oxygen; and,
   b) adding to the fixed oil sufficient amounts of an aqueous solution containing isolated oxygen scavenging cytoplasmic membrane fragments of bacteria and a hydrogen donating organic acid substrate selected from the group consisting of lactic acid, succinic acid, alpha-glycerol phosphate, formic acid, and malic acid to reduce the oxygen present in the oil to water using the hydrogen supplied by the hydrogen donating substrate under conditions suitable for reducing the oxygen present in the oil to water.

4. The method of claim 3, further comprising the step of agitating the oil-aqueous solution mixture.

5. A method for removing oxygen from essential oils comprising the steps of:
   a) providing an essential oil containing oxygen; and,
   b) adding to the essential oil sufficient amounts of an aqueous solution containing isolated oxygen scavenging cytoplasmic membrane fragments of bacteria and a hydrogen donating organic acid substrate selected from the group consisting of lactic acid, succinic acid, alpha-glycerol phosphate, formic acid and malic acid to reduce the oxygen present in the oil to water using the hydrogen supplied by the hydrogen donating substrate under conditions suitable for reducing the oxygen present in the oil to water.

6. The method of claim 5, further comprising the step of agitating the oil-aqueous solution mixture.

7. A method for removing oxygen from safflower oil comprising the steps of:
   a) providing safflower oil containing oxygen; and,
   b) adding to the safflower oil sufficient amounts of an aqueous solution containing oxygen scavenging cytoplasmic membrane fragments isolated from the organism *Escherichia coli* and lactic acid to reduce oxygen present in the oil to water using the hydrogen supplied by the lactic acid under conditions suitable for reducing the oxygen present in the oil to water.

8. The method of claim 7, further comprising the step of agitating the oil-aqueous solution mixture.

* * * * *